(12) United States Patent
Parkin

(10) Patent No.: US 6,700,409 B2
(45) Date of Patent: Mar. 2, 2004

(54) SOURCE SYNCHRONOUS I/O USING TEMPORAL DELAY QUEUES

(75) Inventor: Michael W. Parkin, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/106,264

(22) Filed: Mar. 26, 2002

(65) Prior Publication Data

US 2002/0163363 A1 Nov. 7, 2002

Related U.S. Application Data

(63) Continuation-in-part of application No. 09/850,366, filed on May 7, 2001, now abandoned.

(51) Int. Cl.[7] .............................. G11C 7/00; G11C 8/00
(52) U.S. Cl. .............................. 326/93; 326/40; 326/46; 365/189.01; 365/221; 365/230.02
(58) Field of Search ..................... 326/40, 46, 93; 365/189.01, 230.02, 230.06, 221

(56) References Cited

U.S. PATENT DOCUMENTS

| | | | | |
|---|---|---|---|---|
| 5,088,061 A | * | 2/1992 | Golnabi et al. | 365/189.01 |
| 5,901,100 A | * | 5/1999 | Taylor | 365/219 |
| 6,327,207 B1 | * | 12/2001 | Sluiter et al. | 365/221 |

* cited by examiner

*Primary Examiner*—Daniel Chang
(74) *Attorney, Agent, or Firm*—Rosenthal & Osha L.L.P.

(57) ABSTRACT

A temporal delay circuit for synchronizing a source synchronous input with a local clock is provided. The source synchronous input comprises a data input and a source synchronous clock. The temporal delay circuit includes a temporal delay queue, a write pointer arranged to write the data input to the temporal delay queue based on the source synchronous clock, and a read pointer synchronized with the local clock and arranged to read from the temporal delay queue according to a desired delay.

27 Claims, 5 Drawing Sheets

SOURCE SYNCHRONOUS I/O USING TEMPORAL DELAY QUEUES

CROSS-REFERENCE TO RELATED APPLICATIONS

This is a Continuation-in-Part of application Ser. No. 09/850,366, filed May 7, 2001, now abandoned, entitled "Source Synchronous I/O Without Synchronizers Using Temporal Delay Queues," and assigned to the assignee of the present invention.

BACKGROUND OF INVENTION

In digital systems, data is transmitted between circuit elements. The transmission and reception of data is based on a system clock. The system clock maintains a known time reference to synchronize the activities of the digital system. In a synchronous system, data is expected to arrive at a receiver within a known number of cycles. The number of cycles needed for the data transmission is commonly referred to as "latency".

The system clock may have to route to many circuits elements that have different delays from the source of the system clock. The system clock that is local to a circuit element may be skewed with respect to the system clock that is local to another circuit element. Also, depending on the transmission path, the delay to transmit the data from one circuit element to another may vary. Accordingly, the data from a transmitting circuit element may not consistently arrive within the same clock cycle at a receiver. If the arrival of the data is close to a boundary of a clock cycle, the data may intermittently arrive at different clock latencies due to variations in an operating environment such as temperature, voltage, and/or system noise.

Because latency varies, source synchronous arrangements are often used. With source synchronous transmission, a clock is transmitted with the data to indicate when the receiver should latch the data. The clock edge often transitions near the beginning of when the data is valid. With a source synchronous arrangement, both the data and its associated clock experience similar delays; therefore, the receiver has an appropriate indicator of when the data should be latched.

FIG. 1a shows a section of a computer system (100). The section of the computer system (100) may be representative of circuits on a single integrated circuit, or representative of multiple integrated circuits. Circuit element one (102) and circuit element two (104) may transmit data to circuit element three (106). A local system clock (111) relative to circuit element one (102) and a local system clock (113) relative to circuit element two (104) and circuit element three (106) are skewed with respect to a system clock (109). Clock skew is a result of different delays imposed on various sections of the system clock (109) routing due to different parasitics, such as impedance network $Z_A$ (108) and impedance network $Z_B$ (110).

Circuit element one (102) and circuit element two (104) transmit data on the rising edge of their respective local system clocks (111, 113) during the system clock (109) cycle indicated by "CYCLE N" in the timing diagram of FIG. 1b. Also, send_clk1 (103) and send_clk2 (107) transition similarly to local system clocks (111, 113), respectively. Send_clk1 (103) and send_clk2 (107) provide a source synchronous latching signal to the receivers in circuit element three (106). The transmission delay caused by impedance network $Z_c$ (120) from circuit element one (102) to circuit element three (106) causes the data to arrive after the reception of data from circuit element two (104). The impedance network $Z_D$ (122) causes a reduced delay compared to impedance network $Z_C$ (120). The data from circuit element one (102) and circuit element two (104) arrive within different clock cycles at circuit element three (106). Shown in FIG. 1b, both transmissions take longer than a single clock cycle to propagate to their destination and each has a different arrival time relative to the local system clock (113) cycle boundaries.

In FIG. 1b, the reception of data from circuit element one (102) at circuit element three (106) occurs near a clock cycle boundary of the local system clock (113) of circuit element three (106). Depending on variations in the operating environment, the data transmitted from circuit element one (102) may be received with different latencies.

SUMMARY OF INVENTION

According to one aspect of the present invention, a temporal delay circuit for synchronizing a source synchronous input comprises a data input and a source synchronous clock with a local clock, comprises a temporal delay queue, a write pointer arranged to write the data input to the temporal delay queue based on the source synchronous clock, and a read pointer synchronized with the local clock and arranged to read from the temporal delay queue according to a desired delay.

According to one aspect of the present invention, a method for synchronizing a source synchronous input with a local clock, where the source synchronous input comprises a data input and a source synchronous clock, the method comprises using a temporal delay queue to store the data input based on the source synchronous clock, using a write pointer to determine where to store the data input in the temporal delay queue where the write pointer is based on the source synchronous clock, and using a read pointer to determine a location in the temporal delay queue from which the data input should be read where the read pointer is in phase with the local clock and arranged to read from the temporal delay queue according to a desired delay.

Other aspects and advantages of the invention will be apparent from the following description and the appended claims.

BRIEF DESCRIPTION OF DRAWINGS

FIG. 1b shows a timing diagram associated with FIG. 1a.

DETAILED DESCRIPTION

Embodiments of the present invention relate to a temporal delay circuit for synchronizing a source synchronous input with a local clock. The source synchronous input includes a data input and a source synchronous clock. Embodiments of the present invention further relate to a method for synchronizing a source synchronous input with a local clock.

More particularly, embodiments of the present invention relate to a temporal delay circuit that includes a temporal delay queue, write pointer, and read pointer. The temporal delay circuit uses a write pointer to write data input to the temporal delay queue based on the source synchronous clock. The write pointer determines the address location within the temporal delay queue where the input data should be written. The temporal delay circuit uses a read pointer synchronized with a local clock to read from the temporal delay queue. The read pointer determines the address location within the temporal delay queue where the read data should be read. The temporal delay between the write and read pointers may have a desired temporal delay.

In this disclosure, a four address temporal delay queue is used as an example, but a temporal delay queue could be any number of addresses. At a minimum, the temporal delay queue requires at least three addresses if edge triggered circuit elements store the data, and the temporal delay queue requires at least four addresses if level activated circuit elements store the data. A temporal delay queue with fewer addresses may result in reading the same address to which the data is being written. The data may not be stable at the address being written when the read to the same address occurs. The length of the temporal delay queue may be determined by an analysis of the minimum and maximum latency for data to travel from its source to the temporal delay queue. This analysis may be the result of temperature, voltage, system noise, and/or process variations. Another metric to determine the required length of the temporal delay queue may be the number of addresses required to write the maximum possible data in-transit. Writing data that is in-transit to the temporal delay queue, after a change from a first operating mode has occurred, allows the temporal delay queue to maintain the most recent data values when the system returns to the first operating mode.

Figure 1A:
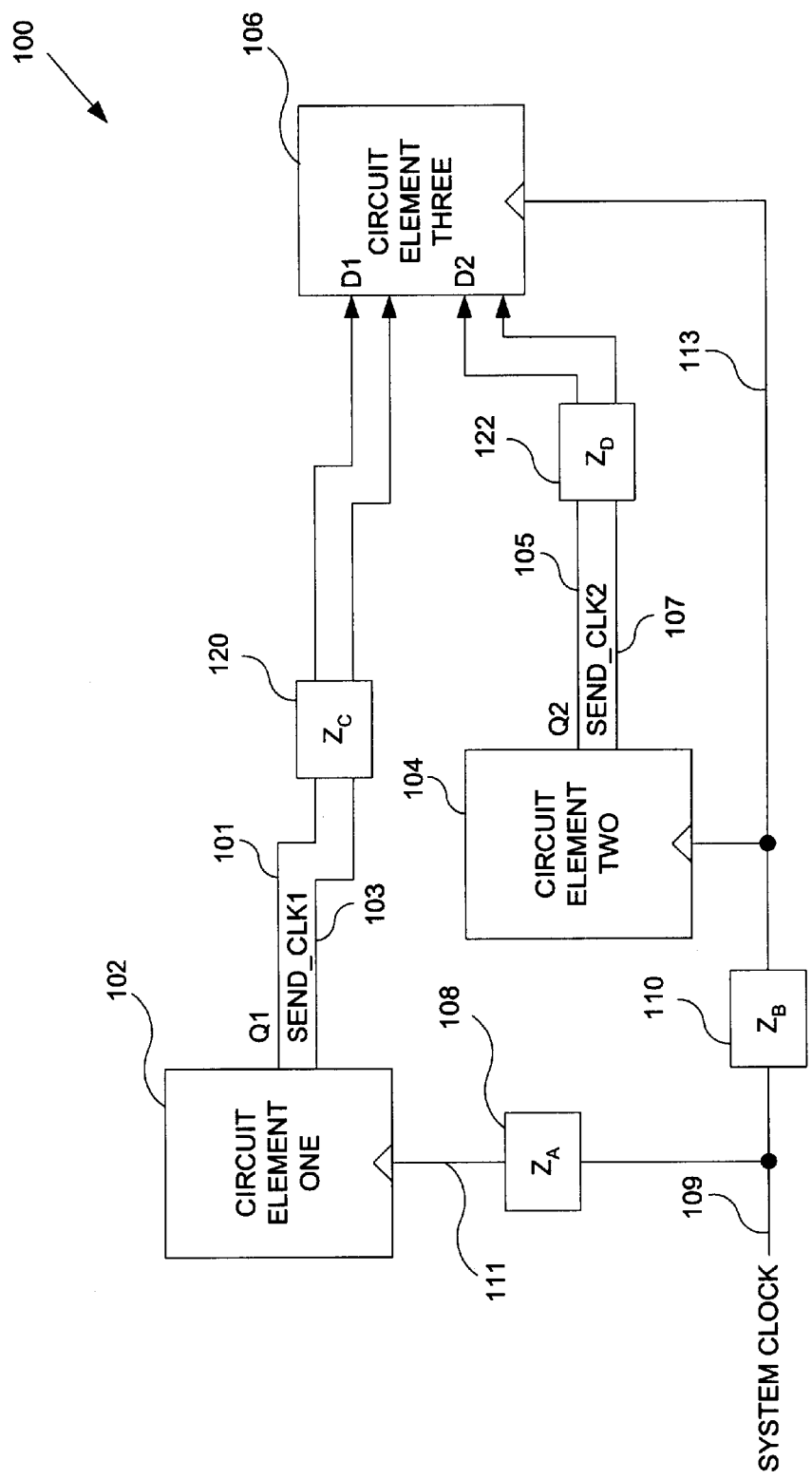
FIG. 1a shows a section of a typical computer system component.
Figure 1B:
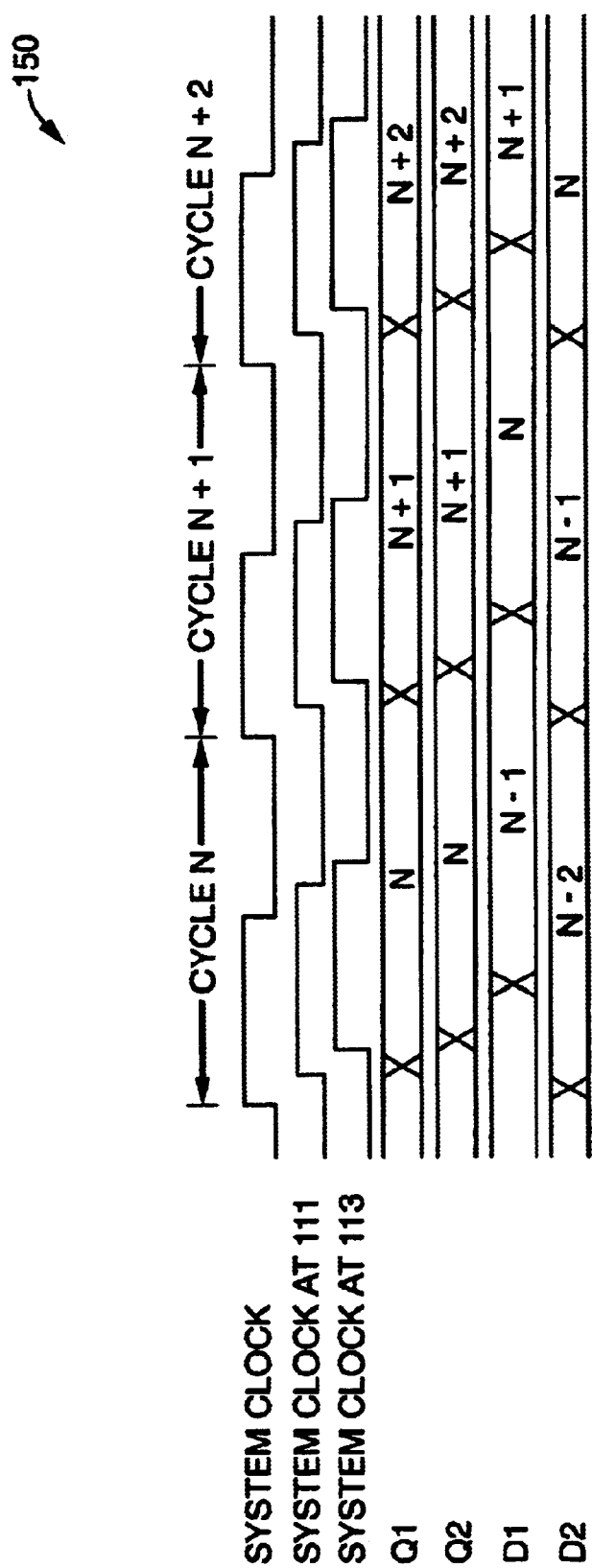
Figure 2:
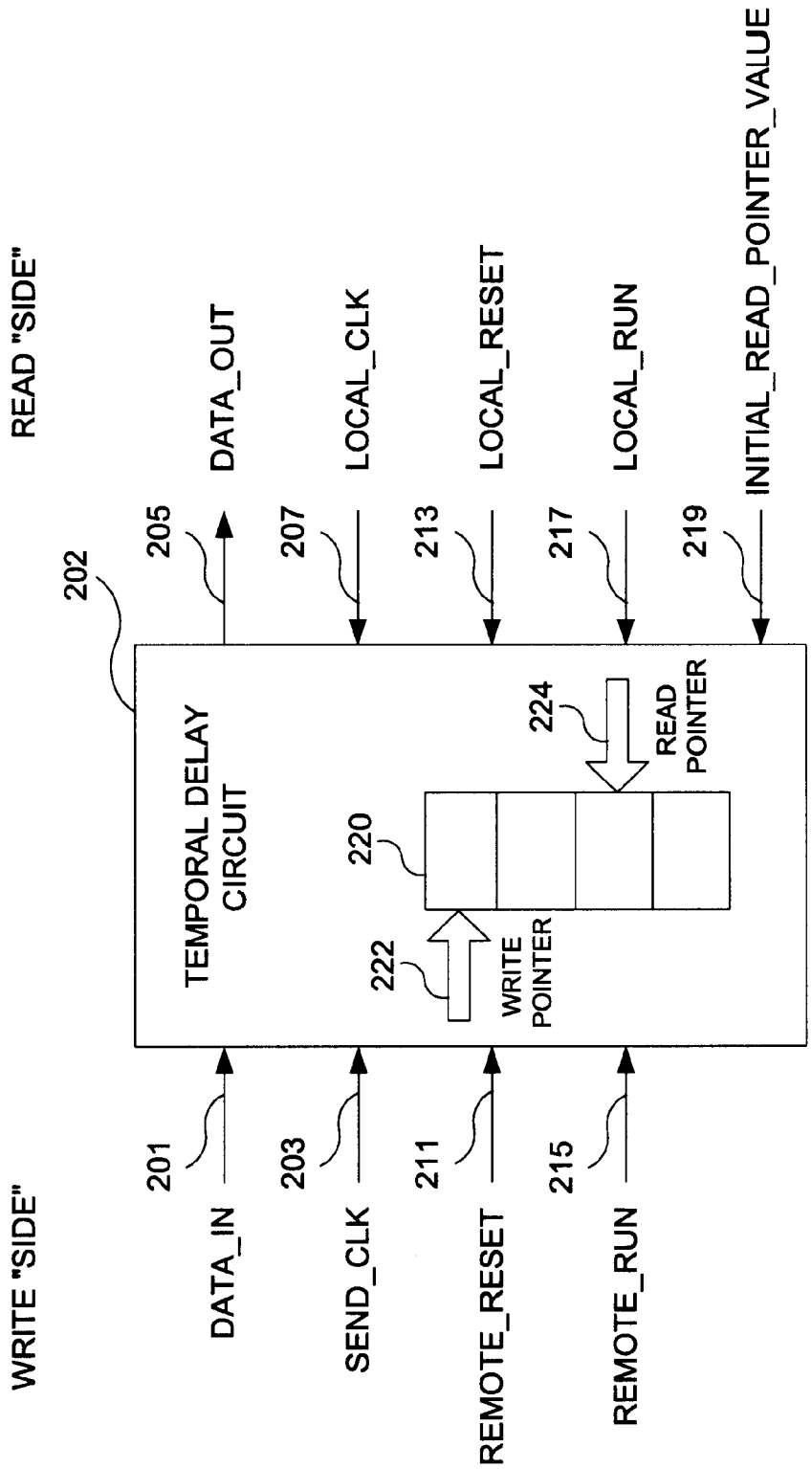
FIG. 2 shows an example block diagram of a temporal delay circuit.

FIG. 2 shows an exemplary block diagram of a temporal delay circuit (202). The three main components of the temporal delay circuit (202) are a temporal delay queue (220), a write pointer (222), and a read pointer (224). The physical location of the temporal delay circuit (202) is arranged so that the local_clk (207) is relatively in phase with a receiving circuit element (not shown) that will be reading the data from the temporal delay queue (220). Data is written to the temporal delay queue (220) by a source synchronous input. The source synchronous input includes data_in (201) and send_clk (203). Both data_in (201) and send_clk (203) travel approximately the same path from the transmitting circuit element (not shown) so that send_clk (203) is a well timed indicator of when data_in (201) should be latched into the temporal delay queue (220). In some arrangements, the send_clk (203) is timed with the middle (i.e., eye) of the time the data_in (201) is valid. Data_in (201) may be transmitted on a rising edge of send_clk (203) but latched in the temporal delay queue (220) on a falling edge of send_clk (203) to latch the data in the middle of the data_in (201) eye. The send_clk (203) also increments the write pointer (222) so that the next write occurs at the next write address in the temporal delay queue (220). The timing of the write operation is controlled by the transmitting circuit element (not shown).

The read operation is controlled by the receiving circuit element (not shown) that is local to the temporal delay circuit (202). The local_clk (207) is relatively in phase with the clock of the receiving circuit element (not shown) that reads the data_out (205) from the temporal delay queue (220). The local_clk (207) determines when new data should be read from the temporal delay queue (220) and also increments the read pointer (224) so that the next read occurs at the next read address in the temporal delay queue (220). Both the send_clk (203) and local_clk (207) have the same frequency.

The remote_reset (211) signal resets the write "side" of the temporal delay circuit (202) when it is at a high potential. A write "side" reset initializes all the values stored in the addresses of the temporal delay queue (220) to a known value (e.g., zero) and initializes the write pointer (222) to the first address. A low potential on the remote_reset (211) signal allows the data_in (201) to be latched by a transition edge of the send_clk (203) and increment the write pointer (222).

The local_reset (213) signal resets the read "side" of the temporal delay circuit (202) when it is at a high potential. A read "side" reset initializes the read pointer (224) to the address indicated by the initial_read_pointer_value (219). The initial_read_pointer_value (219) may be an absolute address or an address relative to the write pointer. The initial_read_pointer_value (219) provides an arrangement to set the write pointer (222) versus read pointer (224) latency to a programmable desired delay. A low potential on the local_reset (213) signal allows the read pointer (224) to increment and valid data to be present at data_out (205) on a transition edge of the local_clk (207). On power up, the read pointer (224) is initialized to an initial read address that corresponds to a desired temporal delay, or latency, between the write pointer (222) and the read pointer (224). Because both the send_clk (203) and local_clk (207) have the same frequency, a constant latency between the write pointer (222) and read pointer (224) is maintained.

The above disclosure assumes a single temporal delay queue. Multiple temporal delay queues are possible. In the following disclosure, two different temporal delay queues are described, one for each of two distinct operating modes. A normal-mode is used for transmitting data during typical operation. A control-mode is used for transmitting data when the state of the system is initialized or queried. Each mode has its own temporal delay queue with its own write pointer, read pointer, resets, and initial read pointer value.

A high potential on local_run (217) selects the normal-mode, read "side" temporal delay queue. A low potential on local_run (217) selects the control-mode, read "side" temporal delay queue. Depending on the state of local_run (217), the signals data_out (205), local_reset (213) and initial_read_pointer_value (219) will read or adjust the read "side" of either the normal-mode or control-mode temporal delay queue.

A high potential on remote_run (215) selects the normal-mode, write "side" temporal delay queue. A low potential on remote_run (215) selects the control-mode, write "side" temporal delay queue. Depending on the state of remote_run (215), the signals data_in (201) and remote_reset (211) will write or adjust the write "side" of either the normal-mode or control-mode temporal delay queue.

When a normal-mode to control-mode change occurs, a global signal is sent to circuit elements that require initialization or inquiry into their state. Because the temporal delay circuit (202) is relatively close to the receiving circuit element (not shown) that controls the read operations from the temporal delay queue, local_run (217) transitions to a low potential before remote_run (215) transitions to a low potential. All write "side" signals (i.e., data_in (210), send_clk (203), remote_reset (211), and remote_run (215)) are generated by the transmitting circuit element (not shown) (i.e., source synchronous). When the read "side" control-mode is entered, data generated during the normal-mode may still be in-transit. Because the remote_run (215) is generated by the transmitting circuit element (not shown), the write "side" of the temporal delay circuit (202) will not enter control-mode until the normal-mode data arrives at the temporal delay circuit (202). The normal-mode data that is in-transit will be written into the normal-mode temporal delay queue. This normal-mode data will be available when the normal-mode is re-entered from the control-mode.

When a control-mode to normal-mode change occurs, a global signal is sent to circuit elements that normal operation may begin or resume. Because the temporal delay circuit (202) is relatively close to the receiving circuit element (not shown) that controls the read operations from the temporal delay queue, local_run (217) transitions to a high potential before remote_run (215) transitions to a high potential. When the read "side" normal-mode is entered, the read pointer advances from the last address while in the previous normal-mode. New normal-mode data will arrive at the temporal delay circuit (202) shortly after the transmitting circuit element (not shown) enters the normal-mode. In other words, both the read pointer and write pointer recall their last positions at the time the normal-mode was exited. Upon re-entry into the normal-mode, both the read and write pointer resume normal operations from their last positions.

Those skilled in the art will appreciate that multiple temporal delay queues may be used for a variety of different activities, for example, different modes, interleaved data transmission, and multiple transmitting circuit elements using a common receiving circuit element.

The arrangement described above uses a pull model for the receipt of data. The receiving circuit element (not shown) retrieves the information from the temporal delay queue as needed. The information is expected to be available (and stable) in the temporal delay queue. The receiving circuit element (not shown) may issue a read command to the transmitting circuit element (not shown) to send data into the temporal delay queue. Storage space for the data in the temporal delay queue is expected to be available.

Another arrangement indicates when data is ready to be read from the temporal delay queue. The frequency of the send_clk (203) and local_clk (207) are the same, but new data_in (201) may not need to be sent on every send_clk (203). The receiving circuit element (not shown) must be able to determine which addresses contain new data and which addresses maintain old or invalid data. The number of bits used to represent a value at each address may be increased to include a valid bit. The valid bit indicates that the data in the temporal delay queue address is valid. The valid bit may be inverted when the address is read.

Another arrangement expands the number of bits used to represent a value at each address in the temporal delay queue to include several sequence bits. Each transmitted data has a sequence number appended to the data by the transmitting circuit element (not shown). Each sequence number is incremented from the previous number. An incremented maximum sequence number goes to zero. The receiving circuit element (not shown) determines if valid data exists by comparing the sequence number associated with the data. Those skilled in the art will appreciate that a variety of communication models exist that may be used with a temporal delay circuit, for example, handshaking, send and receive protocols, and polling.

Figure 3:
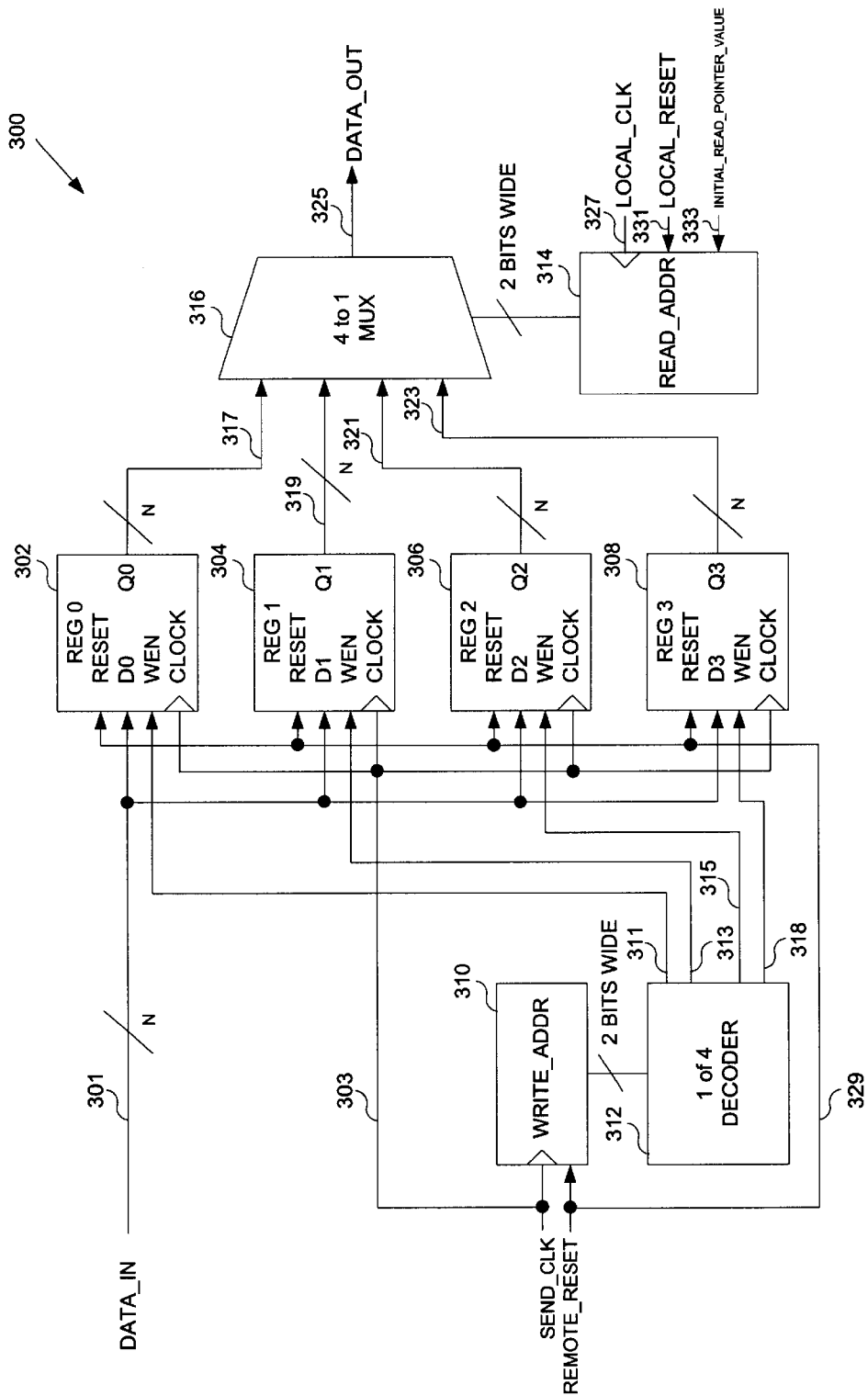
FIG. 3 shows an example circuit diagram of a temporal delay circuit.

FIG. 3 shows an exemplary circuit diagram of a temporal delay circuit (300). The temporal delay queue includes four registers, reg 0 (302), reg 1 (304), reg 2 (306), and reg 3 (308). Each register is N bits wide and may be arranged to contain both data and a valid bit or sequence bits. Data_in (301) provides the data to store in one of the four registers. Send_clk (303) determines when the data on data_in (301) should be latched in one of the four registers by a low to high potential transition of send_clk (303). The send_clk (303) also increments the write_addr (310). The write_addr (310) maintains the address of the current register that responds to a low to high potential transition of send_clk (303).

Because there are four registers in FIG. 3, the write_addr (310) uses 2 bits to represent the address of the register. These two bits determine which one of the four registers are selected by the 1 of 4 decoder (312). One of the four lines (311, 313, 315, 318) is at a high potential. The remaining lines are at a low potential.

In FIG. 3, the stored values (N bits wide) in all four registers, reg 0 (302), reg 1 (304), reg 2 (306), and reg 3 (308), are input into a 4 to 1 multiplexer (316) via lines (317, 319, 321, 323), respectively. The read_addr (314) selects which one of the four inputs on lines (317, 319, 321, 323) to the 4 to 1 multiplexer (316) is output on data_out (325). A rising edge of local_clk (327) increments the read_addr (314) to select the next value to output on data_out (325). As disclosed previously, the remote_reset (329) signal initializes all the values stored in the four registers (302, 304 306, 308) to a known value (e.g., zero) and resets the write_addr (310) to the first register (302). The local_reset (331) signal initializes the read_addr (314) to the address indicated by the initial_read_pointer_value (333). For example, the initial_read_pointer_value (333) is set to a relative latency of one cycle when the remote_reset (329) and local_reset (331) signals are concurrently at a high potential. The write_addr (310) address is set to point at reg 0 (302), and the read_addr (314) address is set to output reg 3 (308). As both send_clk (303) and local_clk (327) update write_addr (310) and read_addr (314), respectively, the write_addr (310) will point at reg 1 (304) and read_addr will output reg 0 (302). The latency of one cycle is maintained between the write and read pointers, even thought the send_clk (303) and local_clk (327) are not in phase and/or synchronized.

The latency set by the initial_read_pointer_value (333) may be equal to or greater than the transmission latency from the transmitting circuit element (not shown) to the temporal delay circuit (300). During the time indicated by the programmed latency, read_addr (314) will be incremented by the local_clk (327) so that the read pointer arrives at reg 0 (302) shortly after valid data is written by the source synchronous input. The latency includes the time needed for data transmission and the time needed for the data in reg 0 (302) to stabilize. Those skilled in the art will appreciate that a write must complete before the next cycle so that the read operation may read the register. Timing guard band is necessary. The write "side" will stay reset until the remote_reset (329) signal propagates from the transmitting circuit element (not shown). When remote_reset (329) gets cleared (i.e., goes to zero potential), the first data will be loaded in reg 0 (302). The temporal delay circuit (300) in FIG. 3 is arranged to latch and increment the temporal delay queue on the rising edge of send_clk (303).

Figure 4:
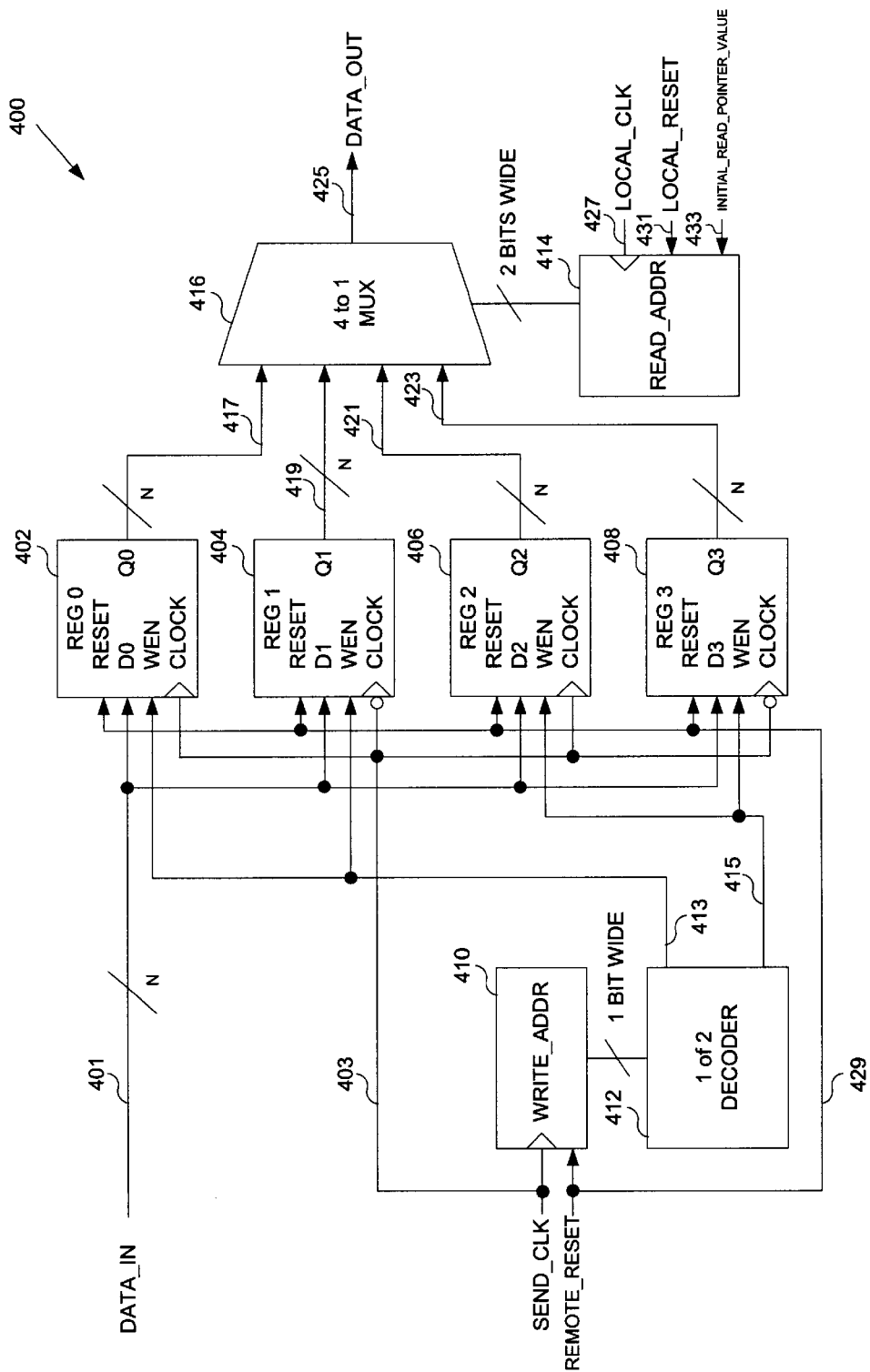
FIG. 4 shows an example circuit diagram of a temporal delay circuit.

FIG. 4 shows an exemplary circuit diagram of a temporal delay circuit (400) that is arranged to latch and increment a temporal delay queue on both the rising and falling edges of send_clk (403). Those skilled in the art will appreciate that reducing the frequency of a clock by half reduces the system noise generated by that clock. By performing operations on both the rising and falling edges of the clock, the same number of operations occur in the same amount of time as accomplished by the arrangement of FIG. 3. In FIG. 4, the temporal delay queue includes four registers, reg 0 (402), reg 1 (404), reg 2 (406), and reg 3 (408). Each register is N bits wide and may be arranged to contain both data and a valid bit or sequence bits. Data_in (401) provides the data to store in one of the four registers. Send_clk (403) determines when the data on data_in (401) should be latched in one of the four registers. A low to high potential transition of send_clk (403) may allow data to be latched in reg 0 (402) or reg 2 (406) depending on the state of their WEN inputs. A high to low potential transition of send_clk (403) may allow data to be latched in reg 1 (404) or reg 3 (408) depending on the state of their WEN inputs. The send_clk (403) increments the write_addr (410) on every low to high transition edge of send_clk (403). The write_addr (410) maintains the address of the current register. Because write_addr (410) is used to select between two groups of two registers, the write_addr (410) uses 1 bit to select one of the two groups of registers. Because only two of the four registers respond to a transition edge of send_clk (401), a 1 of 2 decoder (412) is sufficient to select amongst the registers. One of the two lines (413, 415) is at a high potential. The other line is at a low potential. The two lines (413, 415) selects between one of two groups of registers. The send_clk (403) transition edge selects one of the two registers in the active group selected by the 1 of 2 decoder (412).

In FIG. 4, the stored values (N bits wide) in all four registers, reg 0 (402), reg 1 (404), reg 2 (406), and reg 3 (408), are input into a 4 to 1 multiplexer (416) via lines (417, 419, 421, 423), respectively. The read_addr (414) selects which one of the four inputs to the 4 to 1 multiplexer (416) is output on data_out (425). A rising or falling transition edge on local_clk (427) increments the read_addr (414) to select the next value to output on data_out (425). As disclosed previously, remote_reset (429), local_reset (431) and initial_read_pointer_value (433) function similarly. The operation of the temporal delay circuit (400) shown in FIG. 4 is similar to that of the temporal delay circuit (300) shown in FIG. 3 with the exception that the temporal delay circuit (400) of FIG. 4 operates on both the rising and falling transition edges for the send_clk (403) and local_clk (427) while the temporal delay circuit (300) of FIG. 3 operates on only the rising transition edge for the send_clk (303) and local_clk (327).

Advantages of the present invention may include one or more of the following. The invention provides an apparatus and method to synchronize two different clock domains running at the same frequency but having a phase shift. Also, the invention provides an apparatus and method to synchronize two different clock domains running at the same frequency in which each clock domain may experience differing effects from jitter. The temporal delay circuit allows a programmable latency between the write and read pointer. A single temporal delay circuit design may accommodate a source synchronous transmission from drastically different temporal delays. The temporal delay circuit allows continuous operation as different operating modes are entered and exited. Intransit data is stored in the proper temporal delay queue when a mode is exited. The read pointer returns to the proper location when a mode is entered.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A temporal delay circuit for synchronizing a source synchronous input comprising a data input and a source synchronous clock with a local clock, comprising:

a temporal delay queue;

a write pointer arranged to write the data input to the temporal delay queue based on the source synchronous clock; and a read pointer synchronized with the local clock and arranged to read from the temporal delay queue according to a desired delay; wherein the desired delay is programmable.

2. The temporal delay circuit of claim 1, wherein the source synchronous clock and the local clock are at the same frequency.

3. The temporal delay circuit of claim 1, wherein the temporal delay queue receives data using a pull model.

4. The temporal delay circuit of claim 1, wherein the temporal delay queue comprises means for indicating when data is ready to be read from the temporal delay queue.

5. The temporal delay circuit of claim 1, wherein the write pointer is incremented on a rising edge of the source synchronous clock and on a falling edge of the source synchronous clock if the source synchronous clock is half the frequency of the local clock.

6. The temporal delay circuit of claim 5, wherein the read pointer is incremented on a rising edge of the local clock.

7. The temporal delay circuit of claim 5, wherein the read pointer is incremented on a falling edge of the local clock.

8. The temporal delay circuit of claim 1, further comprising:

a plurality of temporal delay queues wherein each temporal delay queue is associated with a distinct operating mode.

9. The temporal delay circuit of claim 8, wherein a first temporal delay queue is configured to operate in a first operating mode and a second temporal delay queue is configured to operate in a second operating mode, wherein upon a change from the first operating mode to the second operating mode the write pointer is incremented to write in-transit data input to the first temporal delay queue.

10. The temporal delay circuit of claim 8, wherein a first temporal delay queue is configured to operate in a first operating mode and a second temporal delay queue is configured to operate in a second operating mode, wherein the read pointer advances from a last accessed address of the first temporal delay queue while in the first operating mode after resuming operation in the first operating mode from the second operating mode.

11. The temporal delay circuit of claim 1, wherein the desired delay is initialized during power-up.

12. The temporal delay circuit of claim 1, wherein the temporal delay queue comprises at least three address locations if edge triggered circuit elements store the data input.

13. The temporal delay circuit of claim 1, wherein the temporal delay queue comprises at least four address locations if level activated circuit elements store the data input.

14. A method for synchronizing a source synchronous input with a local clock, wherein the source synchronous input comprises a data input and a source synchronous clock, said method comprising:

using a temporal delay queue to store the data input based on the source synchronous clock;

using a write pointer to determine where to store the data input in the temporal delay queue, wherein the write pointer is based on the source synchronous clock; and using a read pointer to determine a location in the temporal delay queue from which the data input should be read, wherein the read pointer is in phase with the local clock and arranged to read from the temporal delay queue according to a desired delay; wherein the desired delay is programmable.

15. The method of claim 14, wherein the source synchronous clock and the local clock are at the same frequency.

16. The method of claim 14, wherein the temporal delay queue receives data using a pull model.

17. The method of claim 14, wherein the temporal delay queue comprises means for indicating when data is ready to be read from the temporal delay queue.

18. The method of claim 14, wherein the write pointer is incremented on a rising edge of the source synchronous clock and on a falling edge of the source synchronous clock if the source synchronous clock is half the frequency of the local clock.

19. The method of claim 18, wherein the read pointer is incremented on a rising edge of the local clock.

20. The method of claim 18, wherein the read pointer is incremented on a falling edge of the local clock.

21. The method of claim 14, further comprising:
using a plurality of temporal delay queues wherein each temporal delay queue is associated with a distinct operating mode.

22. The method of claim 21, wherein a first temporal delay queue is configured to operate in a first operating mode and a second temporal delay queue is configured to operate in a second operating mode, wherein upon a change from the first operating mode to the second operating mode the write pointer is incremented to write in-transit data input to the first temporal delay queue.

23. The method of claim 21, wherein a first temporal delay queue is configured to operate in a first operating mode and a second temporal delay queue is configured to operate in a second operating mode, wherein the read pointer advances from a last accessed address of the first temporal delay queue while in the first operating mode after resuming operation in the first operating mode from the second operating mode.

24. The method of claim 14, wherein the desired delay is initialized during power-up.

25. The method of claim 14, wherein the temporal delay queue comprises at least three address locations if edge triggered circuit elements store the data input.

26. The method of claim 14, wherein the temporal delay queue comprises at least four address locations if level activated circuit elements store the data input.

27. A temporal delay circuit for synchronizing a source synchronous input comprising a data input and a source synchronous clock with a local clock, said temporal delay circuit comprising:
means for using a temporal delay queue to store the data input based on the source synchronous clock;
means for using a write pointer to determine where to store the data input in the temporal delay queue, wherein the write pointer is based on the synchronous clock;
means for using a read pointer to determine a location in the temporal delay queue from which the data input should be read, wherein the read pointer is in phase with the local clock and arranged to read from the temporal delay queue according to a desired delay, wherein the desired delay is programmable; and
means for using a plurality of temporal delay queues wherein each temporal delay queue is associated with a distinct operating mode.

* * * * *